United States Patent

Dos Santos Pato et al.

[11] Patent Number: 5,929,416
[45] Date of Patent: Jul. 27, 1999

[54] READING HEAD ARRANGEMENT FOR TWO DATA CARD TYPES

[75] Inventors: Manuel Augusto Miranda Dos Santos Pato; Antenor Capeli Junior, both of Campinas; Marcos Aurelio Pegoreti, Indaiatuba; Paulo Takashi Moriya, Campinas; Enio Calcavara Junior, Salto, all of Brazil

[73] Assignee: Telecomunicacoes Brasileiras S/A - Telebras, Campinas SP, Brazil

[21] Appl. No.: 08/836,208

[22] PCT Filed: Nov. 28, 1995

[86] PCT No.: PCT/BR95/00059

§ 371 Date: May 6, 1997

§ 102(e) Date: May 6, 1997

[87] PCT Pub. No.: WO96/17318

PCT Pub. Date: Jun. 6, 1996

[30] Foreign Application Priority Data

Nov. 28, 1994 [BR] Brazil ..................................... 9404627

[51] Int. Cl.⁶ ..................................................... G06K 7/00
[52] U.S. Cl. ........................ 235/439; 235/440; 235/441; 235/451; 235/486
[58] Field of Search .................................. 235/439, 440, 235/441, 446, 451, 486, 492, 494

[56] References Cited

U.S. PATENT DOCUMENTS

| | | | |
|---|---|---|---|
| 4,931,622 | 6/1990 | Ohtsuki et al. | 235/486 |
| 5,317,138 | 5/1994 | Togawa | 235/440 |
| 5,332,890 | 7/1994 | Kitahara | 235/440 |
| 5,332,891 | 7/1994 | Togawa | 235/486 |

FOREIGN PATENT DOCUMENTS

| | | | |
|---|---|---|---|
| 0357827 | 3/1990 | European Pat. Off. | 235/440 |
| A4002794 | 8/1991 | Germany . | |

*Primary Examiner*—Donald Hajec
*Assistant Examiner*—Diane I. Lee
*Attorney, Agent, or Firm*—Finnegan, Henderson, Farabow, Garrett & Dunner, L.L.P.

[57] ABSTRACT

A reading head able to process both inductive debit cards and chip cards comprising two dissimilar complementary portions, the internal surfaces of the portions defining the channel housing the data card inserted in the head, the first portion (80) having inductive sensors (83) for the reading of inductive credit cells and the second portion (140) having a magnetic metal plate (142) which completes the magnetic circuit of the inductive sensors, as well as contact pins (162) engaging the terminal pads on the surface of the card. The portions remain normally kept apart by a first set of mechanical coupling devices (84, 85, 86, 88, 89, 93, 94, 95, 144) placed between the two portions, the opening thus provided being substantially wider than the thickness of the card, the mutual approximation of the portions being provided by the mechanical devices at the final part of the card's insertion travel.

5 Claims, 7 Drawing Sheets

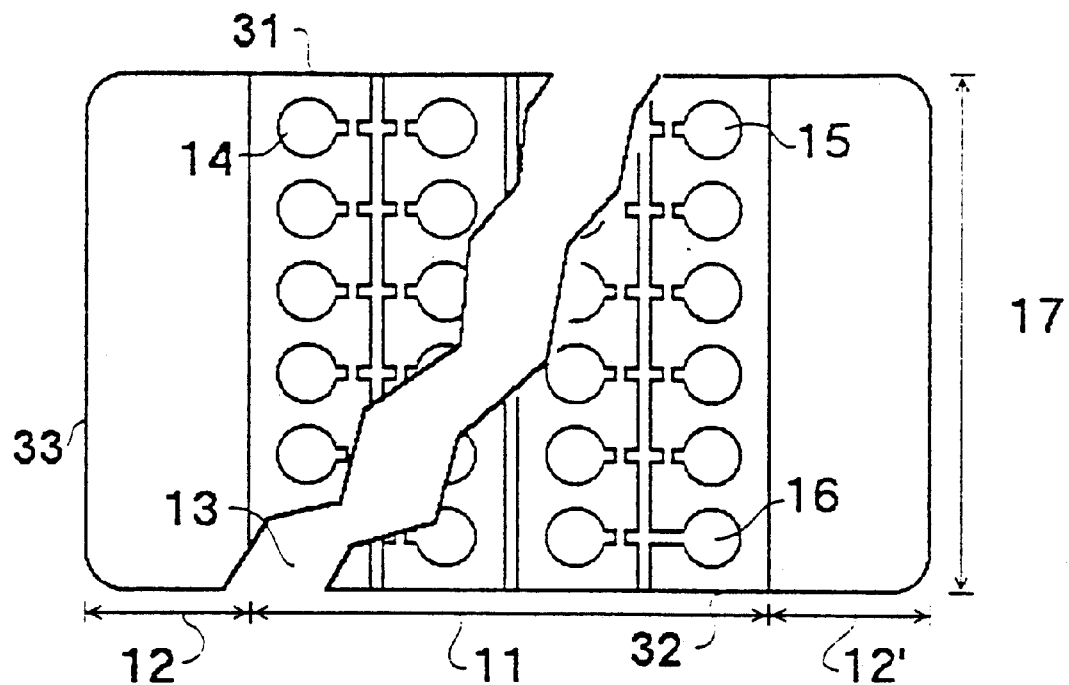
Fig. 1-a *(known technique)*
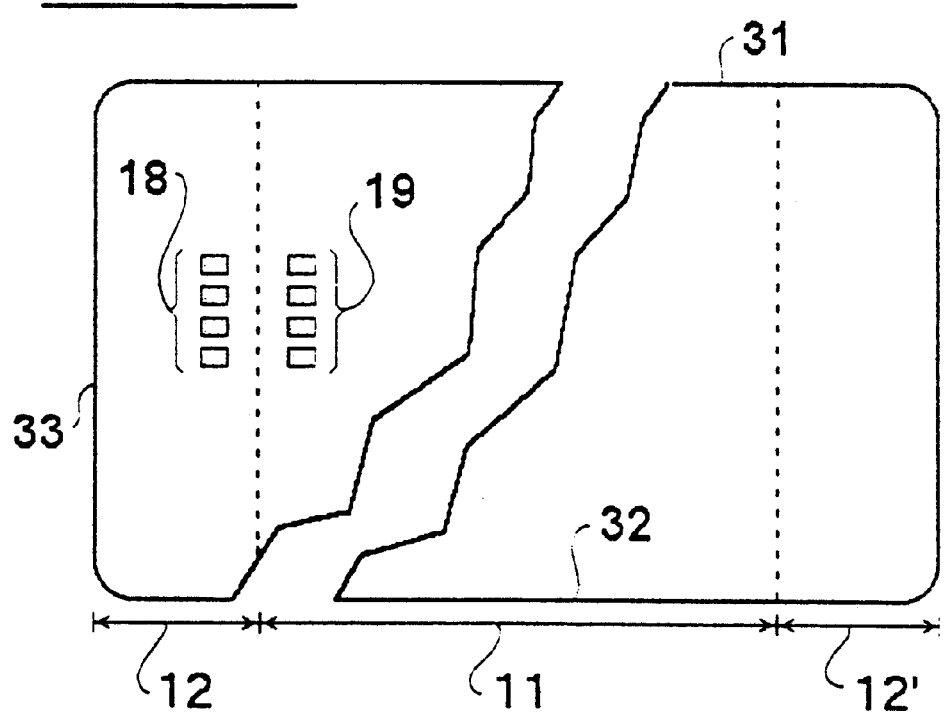
Fig. 1-b *(known technique)*

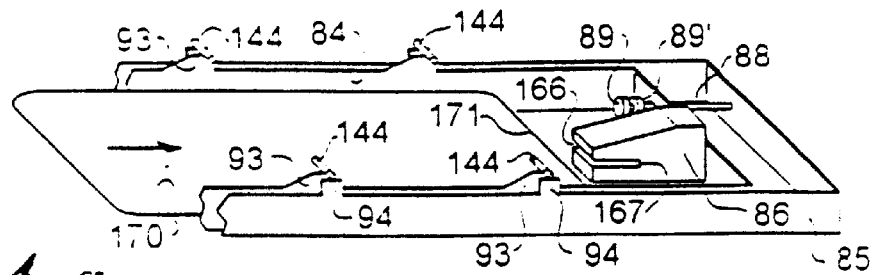
*Fig.4-a*
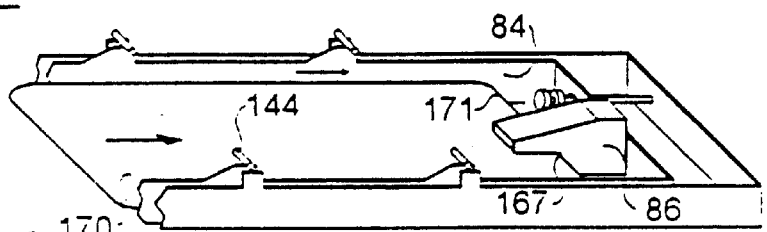
*Fig.4-b*
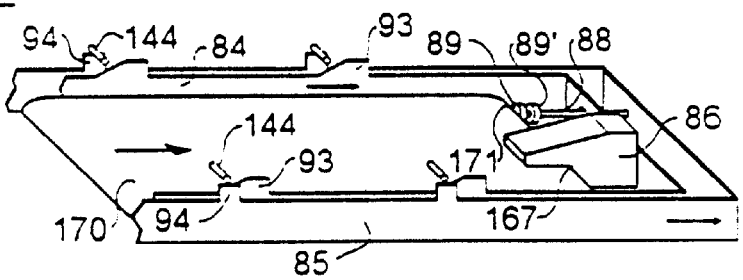
*Fig.4-c*
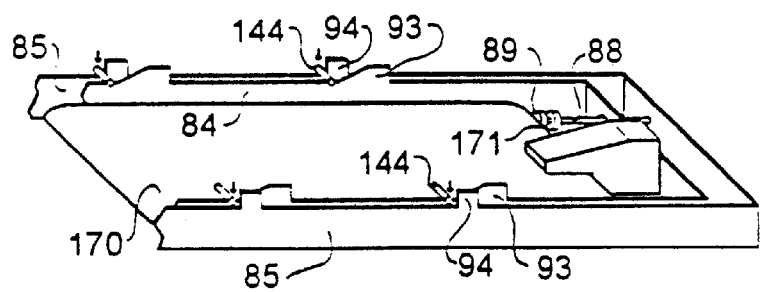
*Fig.4-d*
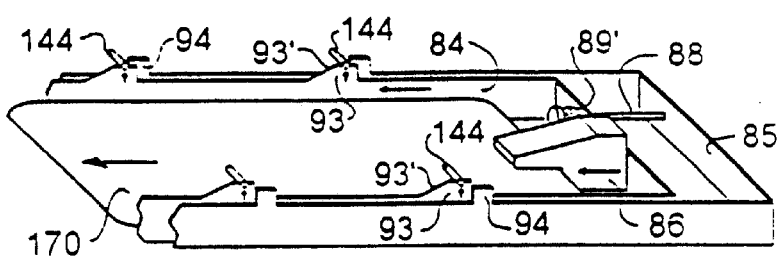
*Fig.4-e*

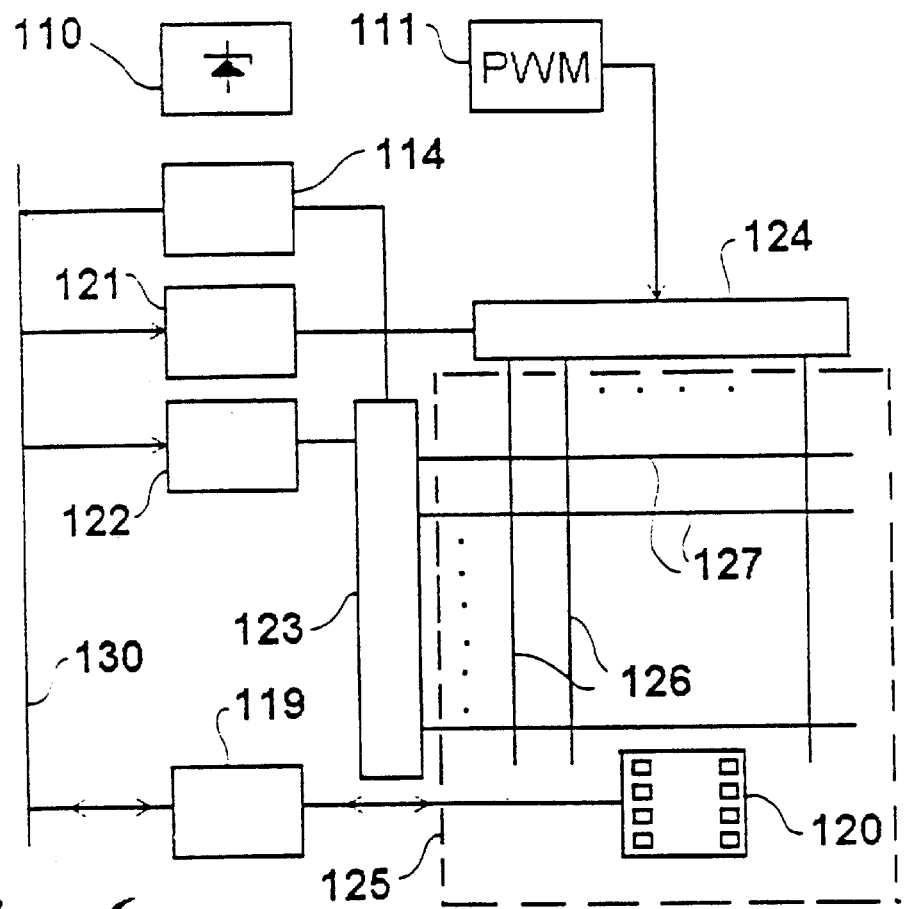
*Fig. 6*
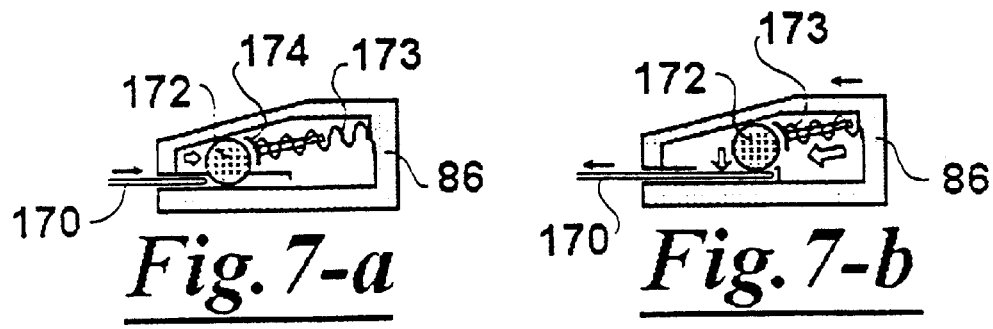
*Fig. 7-a*   *Fig. 7-b*

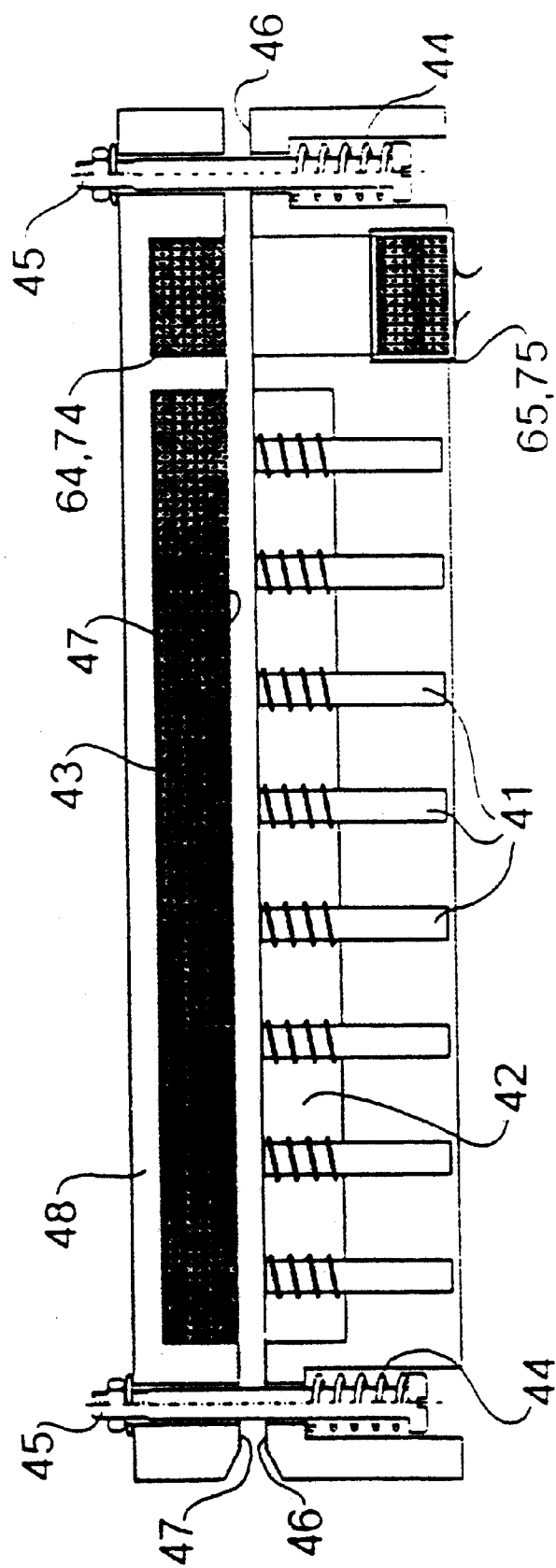
Fig. 8 (known technique)

READING HEAD ARRANGEMENT FOR TWO DATA CARD TYPES

In a general sense, the present invention refers to terminal hardware having the capability of, indifferently, processing two types of portable data elements in the form of a card. More specifically, it refers to the reading of the information contained on inductive cards of the type described in Brazilian patent documents PI 7804885 and PI 9201380, as well as on smart cards with contact pads, i.e. "chip cards" and furthermore, to the recording of new information on both types of cards, without any other manipulation but the manual insertion and withdrawal of said cards by the user.

The inductive cards described in document PI 7804885 are well known and widely used. These contain a series of metallic cells in the form of a closed ring, each corresponding to a credit unit whose reading off is accomplished by the induction of an alternate mangnetic field and its erasure by means of a fusion ("burning out") of the cell material—due to Joule effect—also resulting from the induction of the alternating magnetic field. FIG. 1-a shows a card of this type which is divided lengthwise into three areas, namely, central region 11 containing the credit cells, and two end areas 12 and 12' where there are no cells since these are intended for the handling of the card by the user during the insertion or withdrawal from the card reading device ("reading head"). On this card, four cells 13, 14, 15 and 16, located at the corners of said central area, are used to identify the position and validity of the card, according to the previously mentioned patent document PI 9201380.

Notwithstanding the advantage these cards bear, the physical dimensions of the cells constrain the number of bits which may be stored on each card to a few hundred, thus limiting the use of the cards in applications involving a greater quantity of data to be handled and stored.

The development of electronic circuity of high complexity, integrated on chips having a reduced thickness, has overcome this constraint, thus enabling the manufacture of portable elements—cards—containing one or more chips, such as a microprocessor, memory, etc. in which the memory capability is not limited any longer by the dimensions of the physical substrate. The advent of this technique has enlarged its perspective of use, opening a wide spectrum of applications such as personal data storage (banking, health, etc.), service release keys, transaction registration, etc.

In spite of the foregoing advantages, the advent of smart cards will not eliminate, at least not within a medium time span, the use of inductive debit cards. The latter are being implemented in Brazil and are meeting satisfactorily all the requirements for public telephone call payment. Furthermore, due to the relatively high cost of smart cards, their implementation is not expected to occur soon in Brazil. Another obstacle to such implementation consists of the high cost of the hardware needed for processing the smart cards, which makes it desirable to have a reading device able to interact with both inductive debit cards and smart cards having a processor, so as to avoid a future need of replacing said reading heads in order to implement the use of said smart cards.

Among the problems found in the implementation of this concept one may point out those resulting from the incompatibility of the physical dimensions between both kinds of card, including the incompatibility between the posicioning of the cells in the inductive debit cards and the contact pads for the connection of the smart card within the reading head. In fact, while the thickness of the inductive debit cards is 0.4 mm, the smart card, or chip card, is standardized at 0.76 mm. Therefore, a reading head suited to the insertion of smart cards will have a channel excessively wide for inductive debit cards leading to a poor coupling between the cells of this card and the reading/burning-out inductors.

A possible solution for this incompatability can be found in the Brazilian patent document PI 9204685 which describes a reading head capable of processing cards having different thicknesses. As illustrated in FIGS. 3 and 4 of said document, whose basic features are reproduced in FIG. 8 of the present application, the reading head comprises two dissimilar and complementary portions, the lower one containing the active elements for the exchange of information with the cards, namely, the sensors 41 arranged in a rectangular matrix for reading/burning-out the debit cell of the inductive cards, and the inductors 60, 70, comprising the coils 65 and 75 coils wound around magnetic cores, magnetically coupled to the pick-up coils of the smart cards. The upper part of the reading head contains only magnetic pole pieces 43, 64, 74, the first one a plate or slab that closes the magnetic circuits of sensors 41 and the other two, closing the magnetic circuits of inductors 60 and 70, all assembled on a rigid base of thermoplastic material 48, to which the first portion, the lower one, is attached by means of four screws 45 that act as lead-pins during the separation of the two portions during card insertion, complemented by two helicoidal springs 44 having the purpose of mutually compressing said two portions.

When there is no card inserted in the device, surface 47 of said magnetic plate adjoins surface 46 comprising the internal ends of the magnetic cores 41 and filler material 42 which occupies the spaces between said cores. On inserting a card (not shown), said springs 44 will give, allowing the mutual separation of said portions so as to form an opening whose width will be just enough for the sliding through of the card, be it of the inductive type or of the thicker smart type.

The above mentioned solution has some disadvantages, being the first one the fact that surfaces 46 and 47 exert a pressure on the faces of the card during the sliding insertion. This results in the abrasion of both the card surfaces and the reading head surfaces making contact with the card. Although this wear of the inductive cards stays within acceptable limits due to a limited number of insertions (not exceeding a few hundred at the most), the same is not true for the smart cards which are expected to endure thousands of insertions. On the latter, wear may render the inductive card useless, mainly in the case in which the ambient conditions bring about the accumulation of dust between the contact surfaces, acting as an abrasive.

In the case of smart cards using contact pads for power and data transfer, the problem of wear becomes quite critical since said contact pads have to be exposed on the surface of the smart card. This does not happen with cards provided with pick-up coils, such as described in the previously mentioned patent document.

FIG. 1-b shows, only for illustration purposes, a set of contact pads meeting the international standard ISO 7816-2. Each pad has the minimum dimension of 1.7×2 millimeters and, as shown, the 8 contact pads are positioned in rows 18 and 19 along the opposite sides of a square having sides measuring 7.6 mm. As can be seen, row 18 is located within the handling portion of the card, remaining outside the area occupied by the sensors for reading/burning-out of the inductive credit cells. This does not happen with the row 19, in which the pads are placed inside the central area 11 of the inductive card occupied by credit cells.

From the foregoing, the present invention has the main aim of providing a reading device—reading head—able to exchange information with cards having different thicknesses and free from friction wear during the insertion and withdrawal of the card.

Another aim consists of the provision of means for supplying power and exchanging information with smart cards provided with contact pads—chip cards—which do not interfere with the sensing coils used for the reading and burning-out of credits on inductive cards, so as not to require a reduction in the quantity of credits on these cards.

The above mentioned aims are achieved by the invention through the provision of mechanical coupling means placed between the two portions of the reading head to keep them apart during the insertion or withdrawal of the card; the opening thus provided being substantially wider than the thickness of the card, the two said portions being approximated by said mechanical means only when the card reaches the final part of its insertion travel.

According to another feature of the invention, said reading head comprises mutual elastic compression means between said portions, so as to accept cards having different thicknesses.

According to yet another feature of the invention, the information transfer between the reading head and the card, as well as the supply of power for the card's active circuitry, are achieved by means of conduting pins provided on said second portion of the reading head which touch the contact pads provided on the smart card only at the final part of said card insertion.

The details, further features and other advantages of the invention can be gathered from the following description of a preferred embodiment, when considered in connection with the accompanying drawings wherein:

FIGS. 1-*a* and 1-*b* show the distribution of active and inactive areas on inductive debit cards and of smart cards having contact pads—chip card—according to known techniques; in the case of FIG. 1-*b,* the position of the pads meets international standard ISO7816-2.

FIGS. 4-*a* to 4-*e* show, in detail, the operation of the mechanical coupling means which keep the upper head portion apart from the lower one in the absence of any kind of card, as well as provide its approximation at the end of its insertion in the reading head.

Figure 5:
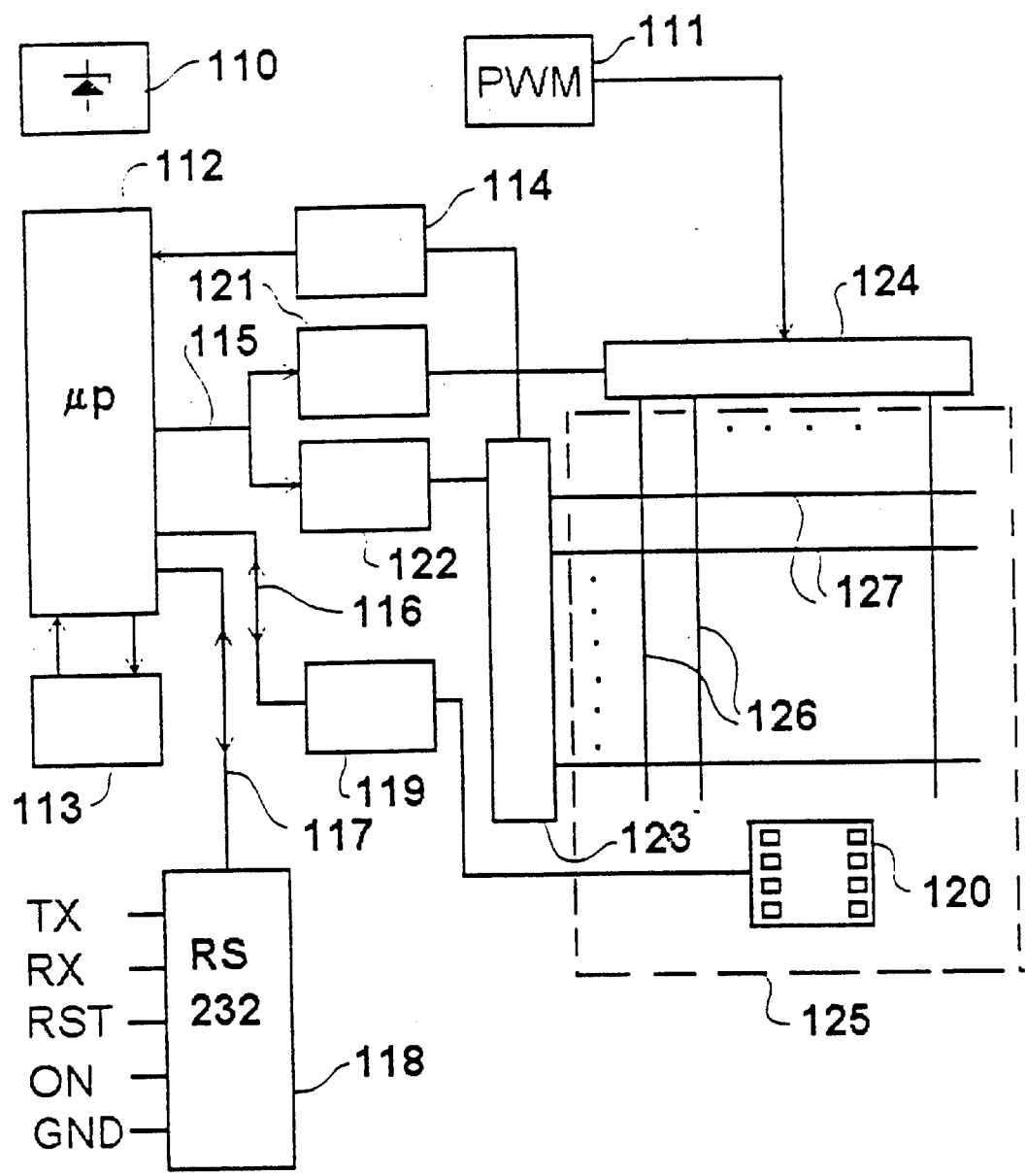

FIG. 5 shows the block diagram of a reading and burning-out circuit having built-in processing means according to the present invention.

FIG. 6 shows the block diagram of a reading circuit having external processing means according to the principles of the present invention.

Figure 3:
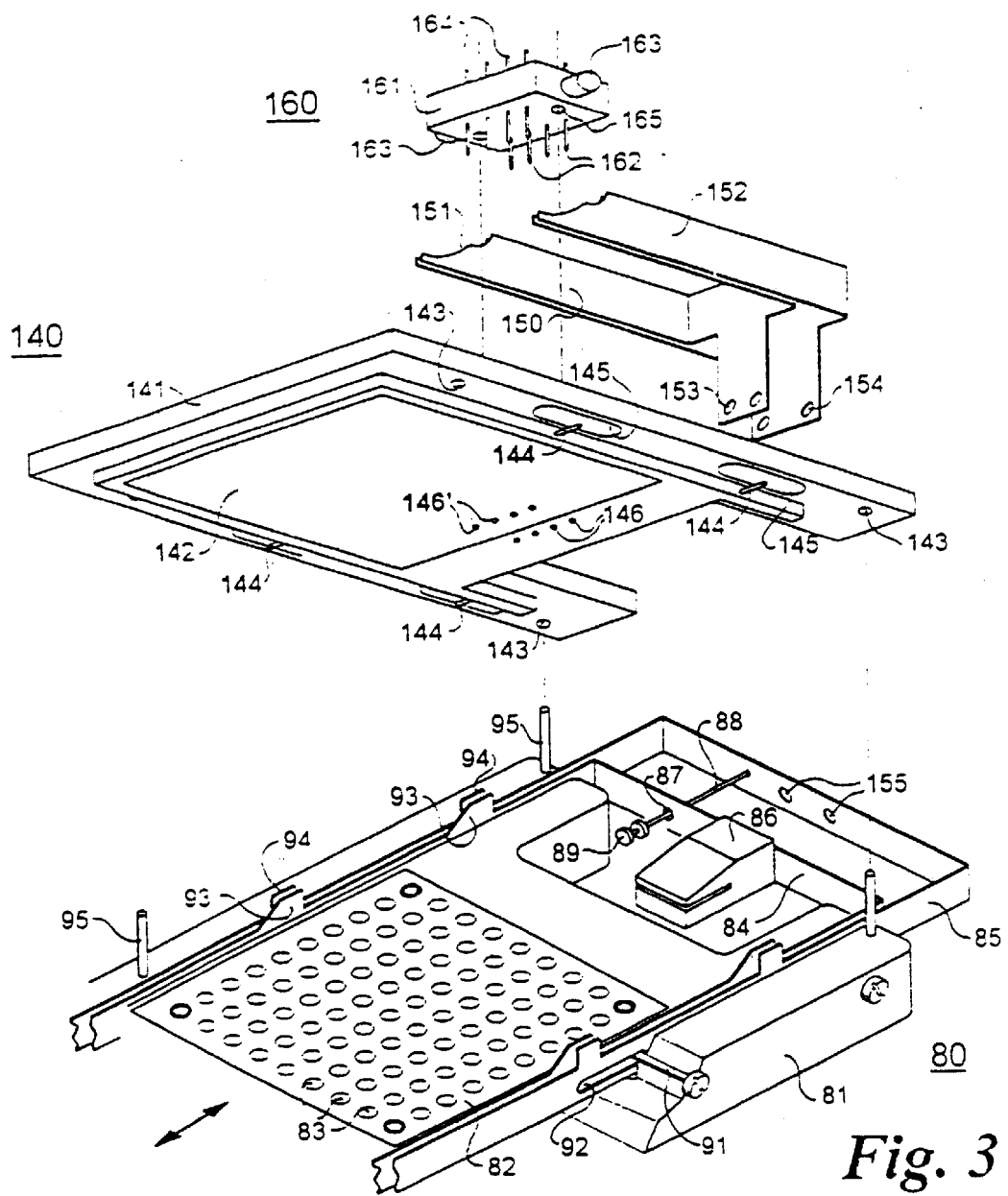
FIG. 3 shows an exploded view of a reading head compatible with both inductive debit cards and with chipcards, built according to the principles of the present invention.

FIGS. 7-*a* and 7-*b* show, in a cross section view, the operation of the unidirectional card grip used in the device shown in FIG. 3, according to the principles of the present invention.

FIG. 8 shows, in a cross section view, the reading head constructed by following known technology as described in Brazilian patent document PI 9204685.

Figure 2:
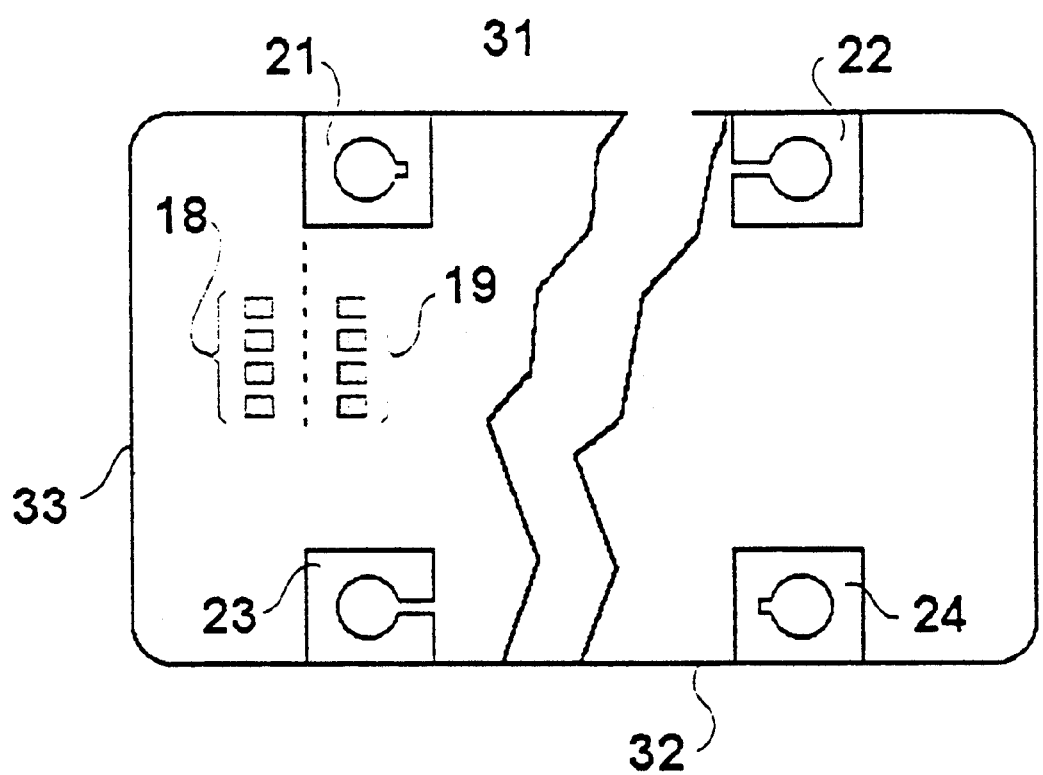
FIG. 2 shows the construction of a smart card having contact pads—a chip card—according to the principles of the present invention and further obeying said standard ISO7816-2.

According to FIG. 2, the smart card having contact pads, constructed according to the principles of the present invention, comprises a set of pads, in two parallel rows 18 and 19 posicioned according to standard ISO 7816-2, the first row of contact pads 18 being positioned within the handling area 12 of the card and the second row, 19, within area 11 provided for credit cells of the inductive credit card. The card shown in FIG. 2 comprises one or more semiconductor integrated circuit chips (not shown) occupying the central part or else the card's handling area. According to the present invention, four identifying elements, 21, 22, 23, 24, are provided which are located in the same position as elements 13, 14, 15, 16 of the inductive cards (FIG. 1-*a*) and serving, like the latter, for the card's correct position and validity identification.

According to FIG. 3, the reading device comprises two different portions, 80 and 140; the former containing a plurality of sensors 83 arranged in a square matrix for the exchange of information with the inductive debit card, the internal faces of the magnet cores being aligned with the internal plane of the insulating block 82 supporting said sensors, forming a first level surface, on which the card slides when inserted or withdrawn from the device. The magnetic circuit of said sensors is completed by the magnetic plate 142, incorporated in the upper portion 140 of the reading head which is pressed against said first surface by means of a spring action not shown in the figure. The aforesaid portion 140 moves vertically along guide-pins 95 which fit into through holes 143.

Still according to FIG. 3, lower portion 80 is provided with two U-shaped metallic frames having square corners, 84 and 85, the sides of the "U" fitting slidingly into longitudinal channels provided at both sides of said sensor matrix. The frame 85 is slightly wider and substantially longer than frame 84 so that the latter fits slidingly into frame 85.

According to the principles of the present invention, the unidirectionalal retaining grip 86 is fixed on the transverse portion of the internal U-frame 84. To the transverse portion of the external U-frame 85 a longitudinal rod 88 is fixed; this rod points toward the front of the reading head, left side in FIG. 3. A hole 87 is provided in the transverse portion of frame 84, through which said rod passes loosely, its front end being fitted with a flat-faced circular stop 89, behind which is a second flat cylindrical enlargement 89'. The left and right sides of external frame 85 are provided with two substantially rectangular tabs 94 projecting upward, i. e., orthogonally to the main plane of the reading head. The sides of the internal frame are also provided with tabs 93 in the same positions with the same orientation and height of the preceding ones having, however, a trapezoidal shape where the slope is directed towards the front of the reading head.

According to the principles of the present invention, the upper portion 140 of the reading head has a substantially retangular shape, the central part of which is occupied by the magnetic plate 142, and having on its sides four rods 144 at right angles to the length of said reading head; said rods rest on the top edges of said tabs 93 and 94 when there is no card inserted in the reading head. The relative positions of the magnetic plate 142 and rods 144, as well as the height of tabs 93 and 94, are provided so as to make the aperture for the card, between the lower surface of plate 142 and said face 82, substantially larger than the thickness of the chip-card, for example 1.5 to 2 millimeters. Oblong holes are 145 placed on the lateral border of portion 140, in the positions of tabs 93, 94, but substantially larger than said tabs, to allow the free vertical movement of said portion, without any interference between tabs 93 and 94 and the body proper of portion 140.

The interconnection with contact pad rows 18 and 19 on the chip card is achieved by means of pins 162, assembled on insulating block 161. The upper ends 164 of said conductor pins are electrically connected through flexible wires, to the electronic circuitry of the reading head. According to the principles of the invention, the lower ends of these pins also stay away from plane 82 when there is no card in the reading head, only approaching the card at the end of the insertion operation. For this purpose, block 161 has two posts 163 which rest on contours 151 of internal brackets 150 and external brackets 152, both having a rectangular "U" shape, the former fixed by means of bolts (not shown) passing through holes 153 and fastened to the transverse portion of moveable frame 84 and the latter also fixed in the same manner on the cross part of frame 85 by bolts or rivets (not shown) which pass through holes 154 and 155. Said block 161 is provided with guiding holes 165 which fit into guiding pins 147, fixed on the upper face of portion 140 to allow only vertical movement of assembly 160. As shown in FIG. 3, the lower portion of contact pins 162 slide into hole rows 146 and 146' positioned in said upper part 140 in accordance with the contact pads in the chip card. According to the principles of the present invention, prior to the insertion of the card into the reading head, the lower ends of these pins remain slightly withdrawn into said holes, thus avoiding any damage to the card surface during its insertion.

The operation of the mechanical coupling means between parts 80 and 140, which lifts and lowers this latter portion of the head can be seen, in greater detail, in the drawings of FIGS. 4-a to 4-e where, for the sake of clarity, the body proper of part 140 has been omitted being shown only the supporting rods 144 of said part.

In FIG. 4-a it can be seen that, at the beginning of the insertion of card 170, said rods 144 are resting on the upper edges of tabs 94 of frame 85 as well as on the upper edges of tabs 93 of frame 84. The insertion direction of the card is indicated by the arrow.

As the insertion proceeds, as shown in FIG. 4-b, it can be noticed that the card has loosely penerated slot 166 of unidirectional retaining grip 86. When the front edge 171 of the card reaches the rear end 167 of said slot, it starts pushing said grip to the right, drawing with it the internal frame 84.

FIG. 4-c shows that the internal frame 84 has moved to the right, following the movement of card 170. Due to this, tabs 93 do not support any longer rods 144 which are now exclusively sustained by tabs 94 of the external frame 85. At the stage shown in FIG. 4-c, front edge 171 of the card has touched the external face 89 at the free end of rod 88 whose other end is fixed on the cross piece of external frame 85; consequently, this frame, including tabs 94, will also begin to be pushed by the moving card.

FIG. 4-d shows the termination of the card insertion where it can be seen that tabs 94 have been completely displaced from the positions of rods 144 which, not being supported any more, come down toward part 80 of the head, in the direction indicated by the arrows, allowing portion 140 of the reading head to approach the card due to the spring action (not shown) which provides the mutual compression of the two parts of said reading head.

After the card has been used, it is withdrawn from the reading head by pulling it out in the direction indicated by the arrow in FIG. 4-e. Unidirectional grip 86, which allowed an easy insertion of the card in slot 166, shows now a higher resistance to the removal of the card in the oposite direction. This resistance causes the device 86 to be drawn together with the withdrawing card as indicated by the arrows in the figure, bringing along internal frame 84. As mentioned previously, tabs 93 are not rectangular, having sloped edges 93' oriented toward the front of the head. Consequently, rods 144 will be lifted as said tabs move toward the front of said reading head therefore bringing about the lifting of part 140 right after the card has begun to be withdrawn. FIG. 4-e shows the moment at which the cross piece of frame 84 touches the back face of enlargement 89' on rod 88; from this point on, frame 85 begins to be pulled in conjunction with frame 84, resulting from this movement the positioning of rectangular tabs 94 under the already lifted rods 144. From this point on, the horizontal movements of said frames 84 and 85 are checked, constrained by the length of slots 92 into which guide pins 91 are fitted, as shown in FIG. 3. A small additional pulling effort on the part of the user will make the card detach itself from the unidirectional retaining device 86, thus enabling the withdrawal of the card from the reading head.

The same principle of vertical movement is made use of to lift and lower contact pins 162; in this case, the vertical displacement of said pins, defined by contour 151, has to be a little larger than that of part 140, since the ends of said pins remain recoiled above the plane of magnetic plate 142 when there is no card inserted into the reading head.

FIGS. 7-a and 7-b show the operation of the unidirectional retaining grip. As shown in FIG. 7-a, this device comprises a cylinder 172 which is pressed in the direction of the entrance slot by spring 173 which pushes the shoe 174. When card 170 is inserted, the spring gives to allow the movement of cylinder 172 to the right, in the direction of the rear end of said slot. The upper wall of said device is slanted, allowing the lifting of the cylinder 172 by card 170 which slides under the cylinder, to reach the far end of the entrance slot.

In FIG. 7-b it can be noticed that when the card is drawn out, the upper wall of the grip acts like a wedge by increasing the compression of cylinder 172 against said card 170, thus increasing the friction of the card against the lower face of the retaining grip and, consequently, hindering its withdrawal. In brief, the device shown offers little resistance to the insertion of the card (FIG. 7-a) and a substantial resistance to its removal (FIG. 7-b).

FIGS. 5 and 6 show, in the form of block diagrams, the electronic hardware of the invention in two preferred embodiments, the first for reading and recording credits on cards having either an inductive technology or smart cards, needing just the execution order to carry out the requested operation, In FIG. 6, the hardware has only the function executing blocks, the timing and sequencing being carried out by an external processor.

According to FIG. 5, said hardware comprises reading head 125 which is analogous to the ones described in Brazilian patents PI 9204434 and PI 9300949 as to the inductive technology, in addition to a set of contacts and corresponding interface for processing chip cards. The inductive sensors are connected to the crossing points of column conductors 126 and line conductors 127, so as to constitute a matrix, switchable by means of a selection of a line and of a column, according to the principles described in Brazilian patents PI 9203968 and PI 9302569.

The operation of the head is controlled by microcontroller 112, the control program being stored in ROM 113. The head checks of the type of card inserted into reading head 125 and carries out the functions requested via interlace RS232, block 118, connected to the microcontroller by means of bus 117, delivering the response to the request also through said interface 118.

The individual selection of each inductive cell is directed by the microcontroller which places the multiplexed address thorugh bus 115 in circtuits 121 and 122, the former enabling one of the column drivers of driver set 124, and the latter completing the selection by turning on one of the line switches of line set 123, according to the operating principles described in aforesaid PI 9203968.

Once the cell has been selected, the enabled oscillator applies an altenating current to the sensing coil, its value being monitored through a condition detector 114 which informs the microcontroller about the status of the cell.

FIG. 5 also shows blocks 110, a linear voltage regulator and block 111, the PWM circuit, or switching voltage regulator, to provide the working voltages to the components and circuits. Also shown is bus 116 for the connection of microcontroller 112 to interface 119 for the smart card, via contacts 120. The need or not for interface 119 is defined by the technology used in the smart cards.

As mentioned before, FIG. 6 shows the hardware as being a set of blocks whose timing functions are supplied by an external processor via bus 130.

When the system is operating it needs to know when and what type of card has been inserted into the reading head. Thus, to check the existence of an inductive card, the system makes use of sensing coils placed at the four corners of the inductive sensing matrix comprised in portion 80 of the reading head (shown in bold trace in FIG. 3), as taught by Brazilian patent PI 9201380. If said coils detect the presence of identifying cells 13 . . . 16, as mentioned in said patent document, the inserted card will be interpreted as being inductive, and the processing will branch into the corresponding routine.

On the other hand, the presence of a smart card, constructed according to the present invention, may be detected by monitoring the electrical current existing at the bus connected to the contact pins 164 (or 120 in FIGS. 5 and 6), or by any other identifying means defined from the features of the integrated circuits enclosed in the card. In this case, the processing will be switched to the subroutine suitable to smart cards.

The initial portion of the card processing by a reader constructed according to the principles of the present invention can be summarized by the following stages:

after inserting the card, a check is made on the existence of a burnt out or intact cell by means of sensors in positions 13 and 14;

if the presence of cells in the conditions described above is detected, the card reader checks the conditions of the cells in positions 15 and 16 so as to ensure the presence of an inductive card, according to the above mentioned PI 9201380. If so, it branches into the routine of inductive card mode. If the conditions of the cells do not correspond to the standard defined for the inductive card, it will show a suitable message in the display;

in case the sensors in the aforementioned positions do not detect the presence of an inductive card, the card reader starts to check the eventual presence of a smart card by monitoring the current on the contacts or through any other suitable process. Once the presence of a smart card has been confirmed, the processing is branched to the corresponding routine. If the presence of a smart card is not confirmed, a suitable message will be shown on the display and a new card presence check out cycle will be started.

Although the invention has been described based on preferred embodiments, it must be understood that changes and modifications are possible without overstepping the bounds of the inventive idea. Thus, for example, inductive cells may be added on smart cards in the four positions reserved for identifying cells, but coded differently from those used on inductive cards so as to allow for a quicker identification of the smart card. Such is the case for the chipcard shown on FIG. 2, where it can be seen that on each longitudinal border of the card the identifying cells are in opposite conditions, i. e., adjacent to border 31 we have cell 21 in a shorted condition and cell 22 in an open condition, while adjacent to border 32 the cell 23 is open and the cell 24 is shorted. Conversely, the inductive debit card shown in FIG. 1-a has both open cells 13, 16 along one border and two shorted cells 14, 15 along the other border.

Moreover, inductive cells may be placed in the central portion provided on smart cards to provide indelible and permanent identification of the bearer, allowing him to access specific functions.

We claim:

1. In a reading head arrangement for inductive data cards having a plurality of credit cells and smart cards having a plurality of contact pads, the smart cards having a greater thickness than that of the inductive data cards, a pair of dissimilar portions having mutually facing internal surfaces to define a data card receiving channel, one of the pair of dissimilar portions including a plurality of inductive sensors corresponding to and for reading the plurality of credit cells on an inductive data card, the other of the pair of dissimilar portions including a magnetic material plate, for completing the magnetic circuits of the inductive sensors, and a plurality of contact pins, corresponding to the plurality of contact pads, for engaging the contact pads of a smart card to exchange information with and supply power to the smart card, the improvement wherein:

the internal surfaces of the pair of dissimilar portions are normally spaced by a first set of mechanical coupling means between the dissimilar portions so that the card receiving channel is substantially wider than a maximum thickness of the inductive data cards and smart cards, and the internal surfaces of the pair of dissimilar portions are movable toward each other by the mechanical coupling means upon final card insertion travel into the card receiving channel.

2. The reading head arrangement of claim 1, wherein lower ends of the contact pins normally remain recoiled from the internal surface of the magnetic plate, and movement of the contact pins toward the card surface is provided by second set of mechanical coupling means activated upon final card insertion travel into the card receiving channel.

3. The reading head arrangement of claim 2, wherein the second set of mechanical coupling means comprises first and second U-shaped brackets, open at free ends in a direction opposite to the direction of card insertion travel, the free ends of the brackets are provided with curved upward sloping contours, the brackets are respectively attached to the first and second moveable frames, the contours support posts attached to transverse ends of an insulating block to which two rows of contact pins are secured, and movement of the insulating block is vertically guided by guide-pins fixed on an upper face of the other portion of the pair of dissimilar portions, the guide-pins slidingly engaging guide-holes in the insulating block.

4. The reading head arrangement of claim 1, wherein the first set of mechanical coupling means comprises a first frame and a second frame, the first and second frames are substantially U-shaped with square corners, open at a front of the reading head and having lateral sides parallel to a direction of the card insertion travel, the lateral sides of the first frame are provided with trapezoidal tabs extending perpendicularly to the internal surfaces of the one of the pair of dissimilar portions toward the other of the pair of dissimilar portions, the second frame is external to and having sliding contact with the first frame, and is provided on the lateral sides thereof with substantially rectangular tabs parallel to and substantially coincident lengthwise with the trapezoidal tabs, a transverse portion of the first frame is provided with a unidirectional retaining device and a transverse portion of the second frame is provided with a longitudinal rod having an end directed towards the card and provided with a card engaging stop.

5. The reading head arrangement of claim 4, wherein the first set of mechanical coupling means also comprises a set of rods perpendicular to the length of the reading head, fastened to lateral portions of the other portion of the pair of dissimilar portions, and positioned in substantial lengthwise coincidence with and resting on upper edges of the trapezoidal and rectangular tabs in a normal spacing of the internal surfaces.

* * * * *